United States Patent [19]

Anderson et al.

[11] Patent Number: 5,381,997
[45] Date of Patent: Jan. 17, 1995

[54] TANK CAR VENTING SYSTEM

[76] Inventors: Todd W. Anderson, 9576 Main St., Cincinnati, Ohio 45242; Richard L. Fahl, 2403 Oak Tree Dr., Fairfield, Ohio 45014

[21] Appl. No.: 143,464

[22] Filed: Oct. 26, 1993

[51] Int. Cl.6 ............................................. F16K 31/126
[52] U.S. Cl. ..................................................... 251/61.2
[58] Field of Search ................... 251/61.2, 61.3, 61.4, 251/61.5

[56] References Cited

U.S. PATENT DOCUMENTS 4,522,369  6/1985  Gemignani .................... 251/61.5
4,721,283  1/1988  Wilson ............................ 251/63.4

Primary Examiner—Robert G. Nilson

[57] ABSTRACT

A vent valve for a transport tank car is actuated by pressurized air from the tank cars brake system. The valve is opened by this pressurized air to permit flow of air, through a vent passageway, into or out of the tank. A bellows isolates the pressurized air system from the flow of air in the vent passage so that the braking air system will not be adversely affected by vapors from hazard products loaded in the tank.

8 Claims, 2 Drawing Sheets

TANK CAR VENTING SYSTEM

The present invention relating to improvements in venting systems for tank cars.

One aspect of the distribution of many liquid products, having particular reference to hazardous liquid products, is their transportation in tank trucks. In the loading of product into a tank car, a vent valve is opened to permit air to be displaced therefrom and thereby prevent overpressurization. Similarly, when product is unloaded from the tank truck, the vent valve is opened to prevent the buildup of a negative pressure, that could also cause a failure in the structural integrity of the tank and leakage of product.

A vent valve of the type herein referenced is found in U.S. Pat. No. 4,721,283, which is of common assignment with the present application.

Many hazardous products vaporize so that hazardous vapors are entrained in air that is displaced from the tank as it is being loaded. In order to prevent pollution of the atmosphere, the product vapors are captured as they are displaced from the tank truck and then returned to a bulk storage tank from which the tank truck is being loaded. Similarly, when a tank truck is unloaded into relatively small storage tanks, vapor containing air is displaced from these tanks and returned to the tank car in order to prevent air pollution, as well as to prevent a negative pressure buildup in the tank truck.

The point being made is that the vent valve operates in an atmosphere in which it is exposed to hazardous and/or corrosive vapors. In the past it has been an accepted practice to actuate this vent valve through the use of pressurized air derived from the tank truck's braking system.

More specifically, the braking system air was employed to displace a piston, on which a valve poppet was mounted, to open the vent valve. One side of the piston would be exposed to the vapor laden air flowing through the vent valve. The other side of the piston would be exposed to the pressurized air system employed for braking purposes.

It has been discovered that the sliding seal, provided by the piston, permitted significant amounts of hazardous vapors to enter the braking air system and, potentially, to deteriorate that system and compromise its authority. Additionally, the pressurized air, employed to actuate the vapor valve, is discharged to atmosphere. Since the piston seal permits vapors to pass into the braking air system, these vapors are discharged into and become a source of air pollution.

Accordingly, the object of the present invention is to prevent vapor-containing air, flowing through a tank truck vent valve, from entering the pressurized air system, which actuates the vent valve.

Another and related object of the present invention is to enable the continued use of pressurized air, derived from a tank truck's braking system, to actuate the referenced vent valve, while at the same time eliminating the possibility of the braking system of the ambient atmosphere being contaminated by vapors from product loaded into the tank truck.

In brief and, in accordance with the broader aspects of the invention, the foregoing ends may be attained by a tank truck venting system which comprises a vent valve that is actuated by air derived from the tank truck's braking system and which includes means for isolating the pressurized air from the air flowing through the vent valve, thereby preventing hazardous vapors from entering the brake system.

In accordance with more specific aspects of the invention the foregoing ends are attained through a tank truck venting system comprising a vent valve, adapted to be mounted on the tank. The vent valve comprises a housing having a vertically disposed tubular portion, that defines one end of a vent passage and a horizontally disposed tubular portion, that defines an opposite end of the vent passage. The housing also comprises a second vertically disposed tubular portion, projecting downwardly from the horizontal tubular portion and disposed centrally of the first vertically disposed tubular portion. The second vertically disposed tubular portion defines, in part, a valve actuation chamber. A downwardly facing, valve seat is formed on the first vertical tubular portion. A poppet is engageable with said valve seat and has a stem projecting therefrom into the second tubular portion. Means are provided for resiliently maintaining the poppet in a elevated position, in engagement with said valve seat, thereby closing the vent valve. The poppet is displaced to an open position by means for selectively introducing pressurized air, from the tank car's brake system, into the upper end of said second tubular portion.

This system is characterized in that flexible means connect the upper end of the valve poppet stem to a lower portion of the second tubular housing portion, thereby completing the definition of an expansible chamber. The flexible means provide a fluid impervious seal between the brake air system and air flowing in the vent passage. The brake system is thus isolated from hazardous vapors entrained in the air flowing in the vent passage.

Preferred features of the invention are found in the use of bellows means, one end of which is connected to the second tubular portion and the other end of which is connected to the lower portion of the second tubular housing portion.

The bellows means may comprise a bellows which also functions to provide the resilient means for resiliently maintaining the valve poppet in sealing engagement with the valve seat.

Further, a plug may be threaded into the lower end of the second tubular portion. This plug has a central opening for slidably journaling the valve poppet stem.

Additionally the flexible means, connecting the valve poppet stem and the lower end of the second vertical housing portion may comprise a bellows assembly that includes an upper disc, a lower disc, and a resilient bellows. The upper end of the bellows is bonded to the upper disc and the lower end of the bellows is bonded to the lower disc. The lower disc is sealingly clamped in the lower end of the second vertical housing portion by said plug to provide a static seal therebetween. Static means sealingly secure the upper disc to the upper end of the valve poppet stem.

The above and other related objects and features of the invention will be apparent from a reading of a following description of a preferred embodiment thereof and the novelty thereof pointed out in the appended claims.

Figure 1:
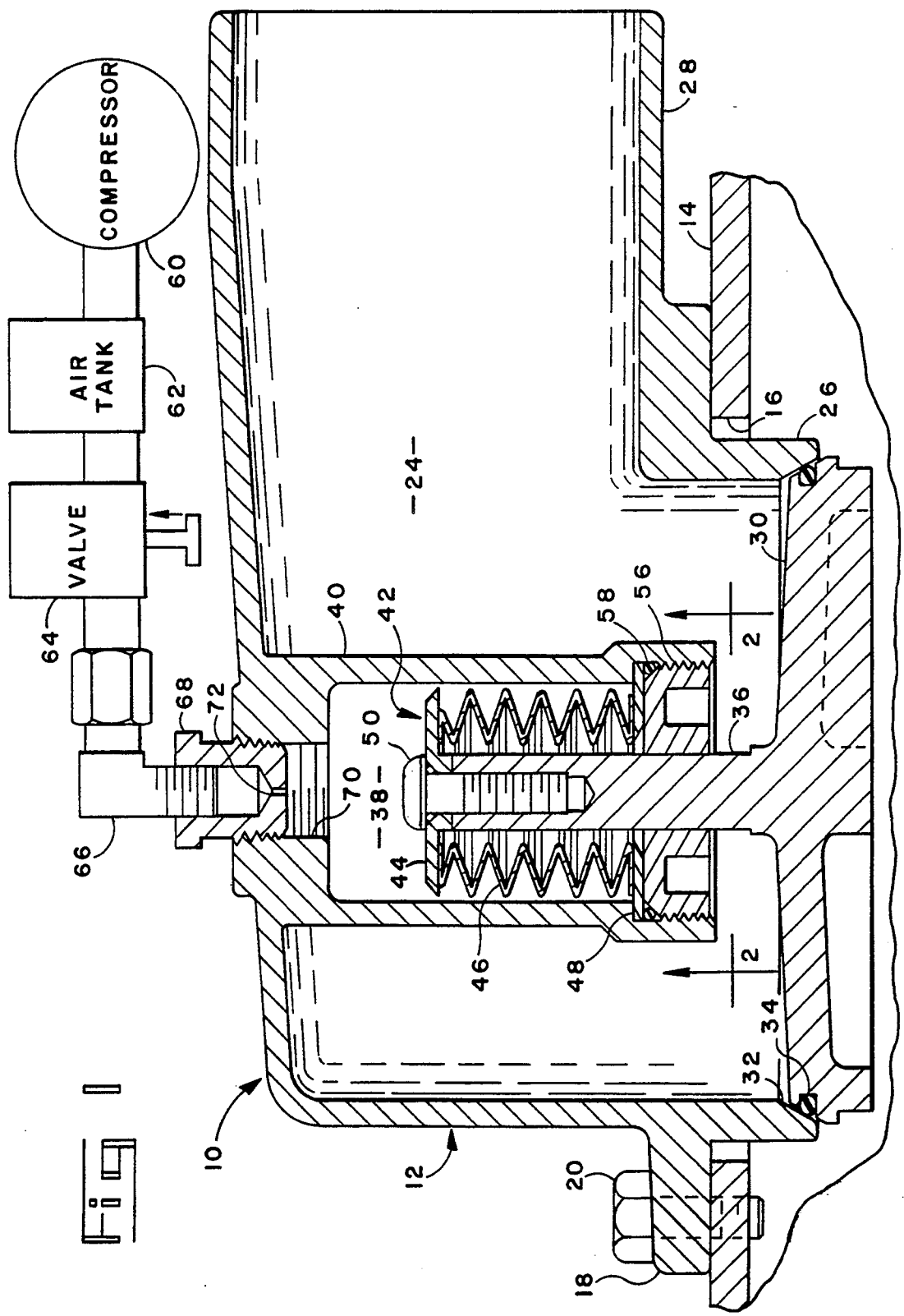
FIG. 1 is a sectional view of a vent valve, embodying the present invention, mounted on a tank car, with the actuating system therefor, illustrated schematically.
Figure 2:
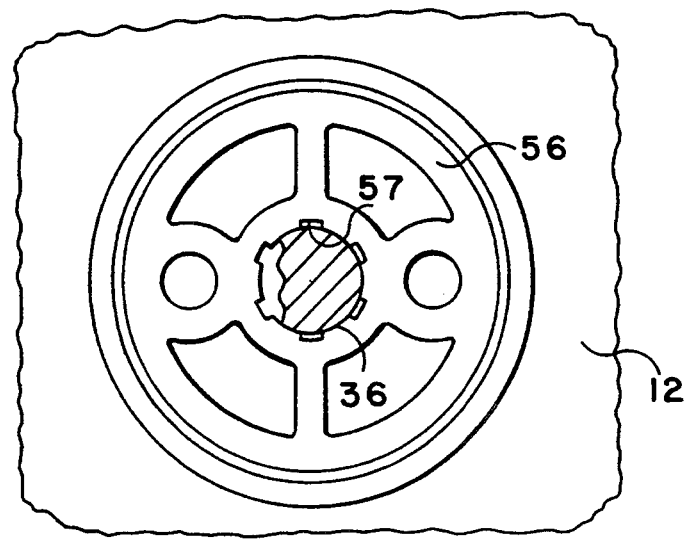
FIG. 2 is a section, on an enlarged scale, taken on line 2—2 in FIG. 1.
Figure 3:
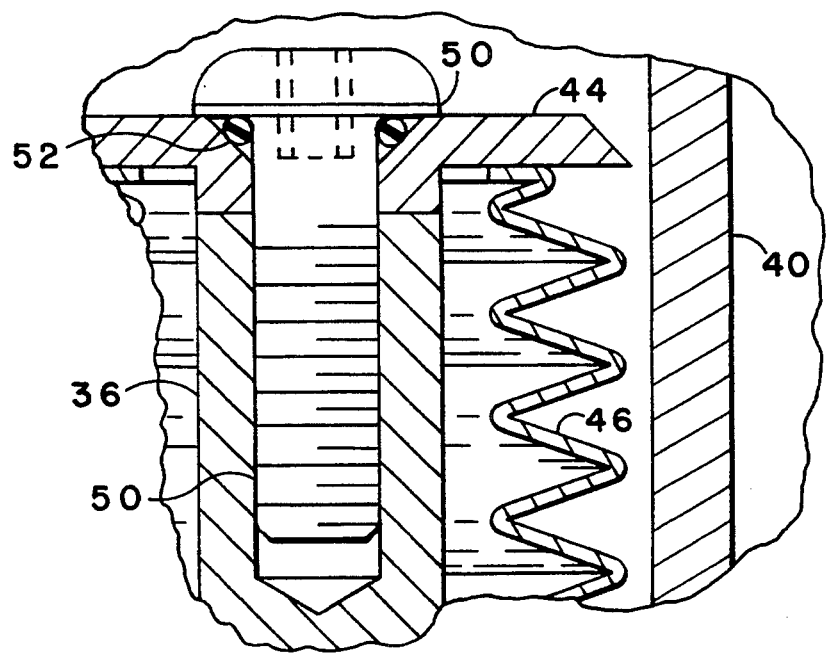
FIG. 3 is an enlarged view of a portion of the vent valve seen in FIG. 1.

The venting valve of the present invention will be first described with reference to FIG. 1, where it is generally indicated by reference character 10. The valve 10 comprises a multifunction housing 12. The valve 10 is illustrated in its installed position on a tank car and more specifically on the upper portion of the tank 14 in registered relation with an opening 16 therein. The housing 12 includes a flange 18, which facilitates mounting of the valve 10 on the tank 14 by means of bolts 20.

The housing 12 also includes a vent passageway 24, one portion of which is vertically disposed and defined, in part, by a tubular portion 26, that projects through the tank opening 16. The other end of the vent passageway 24 is defined by a horizontally disposed, tubular portion 28 that is closely spaced from the upper surface of the tank 14.

The flow controlling portions of the valve 10 comprise a poppet 30 which is engageable with a conical seat 32, formed on the tubular portion 26. Actual sealing engagement is through an O-ring 34.

The poppet has an upwardly extending stem 36 which projects upwardly into a chamber 38, that is defined in part by a tubular portion 40 of the housing 12 and projects downwardly into the vent passage 24. A bellows assembly 42 is affixed between the upper end of the stem 36 and the lower end of the tubular housing portion 40.

The bellow assembly comprises an upper disc 44, a stainless steel bellows 46 and a lower disc 48. The ends of the bellows 46 are, respectively, welded to the discs 44 and 48, or are otherwise bonded thereto so that a fluid tight seal is provided therebetween. The upper end of the assembly 42 is secured to the upper end of the stem 36 by a screw 50 that extends through the disc 44 and is axially threaded into the stem 36. The connection between the disc 44 and the stem 36 is provided with a static, fluid seal by means of an O-ring 52, which is compressed into sealing engagement with a countersink in the disc 44 and the stem 36 by the head of the screw 50.

The lower bellows disc 48 is provided with a similar static seal connection with the tubular housing portion 40, to complete the sealing of the chamber 38 so that it is isolated from the vent passage 24. Thus, a plug 56 is threaded into the lower end of the tubular housing portion 40 to clamp the disc 48 against a shoulder at the lower end of the chamber 38. A positive seal is provided by an O-ring 58 that is compressed into sealing engagement with the disc 48 and the housing portion 40 by the plug 56.

It will be noted that the plug 56 also serves as a guide for the poppet valve stem 36. Since the portion 40, into which the plug 56 is threaded and the portion 26, on which the valve seat 32 is formed, are both portions of the casting 12, a high degree of accuracy is achieved in positioning the poppet 30 for proper sealing engagement with the seat 32. It will also be noted that longitudinal slots 57 are provided in the sliding journal formed in the plug 56, for the poppet stem 36. These slots provide a pressure balance on opposite sides of the plug 56 to facilitate movement of the poppet 30 between its open and closed positions.

The sealing O-rings 52 and 58 are preferably formed of Teflon (polytetraflouroethylene) which is highly effective in providing a sealing action, but also is highly resistant, if not immune, to chemical attack and degradation from exposure to hydrocarbon fuel vapors and other hazardous liquids commonly carried in tank cars of the present type.

The bellows 46 serves as a flexible barrier between the chamber 38 and the vent passage 24. Additionally, the bellows 46 functions as a compression spring, which yieldingly urges the poppet 30 to its closed position. The poppet 30 is displaced to its open position by pressurization of the chamber 38, as will now be described.

Pressurization of the chamber 38, to open the poppet 30, is achieved through the use of pressurized air derived from the brake system for the tank car. Such brake systems comprise a compressor 60 which pressurizes air and maintains a reservoir of pressurized air in an air tank 62. Air for actuating the tank car's brakes is derived from the pressurized air tank 62. Pressurized air for actuating the vent valve 10 is also derived from the air tank 62, by way of a valve 64. In one position of the valve 64, air is directed from the tank 62 to a standard elbow fitting 66, that is threaded into a bushing 68. The bushing 68 is mounted on the housing 12, being threaded into a hole 70 that extends into the upper end of the chamber 38. In the second position of the valve 64, flow of air from the air tank 62 is sealed and the chamber 38 is depressurized by being vented to atmosphere. Air passing into and out of the chamber 38 is throttled by an orifice 72 formed in the bushing 68.

Typically the present vent valve is employed in loading and unloading cargo from the tank car. In a loading operation, from a bulk storage tank, the tank is connected to a bulk storage tank, by an appropriate hose, or other conduit. As product is being loaded into the tank, the air space in the upper portion of the tank is progressively reduced. In order to prevent overpressurization of the tank, the vent valve poppet is opened by displacing the valve 64 to pressurize the chamber 38. One manner of opening the valve 64 is to make its opening movement responsive to connection of a loading hose to the tank car.

The air being displaced from the tank, during a filling operation, is generally saturated with vapors from the product being loaded into the tank. In the case of hydrocarbon fuels, these vapors are a source of harmful air pollution. Other tank car cargos can give off even more hazardous vapors. Thus, it is a common practice to recover the vapors displaced from the tank during a loading operation. A recovery hose may be attached to the tubular portion 28 of the housing 12 in order to return the displaced vapors back to the bulk storage tank from which the tank car is being loaded, or to some other remote location that prevents their dissemination into the atmosphere.

Similarly, when the tank car is unloaded, the valve 64 is actuated to pressurize the chamber 38 and open the poppet 30. Venting of the tank in this fashion prevents the buildup of a negative pressure in the tank that could result in a breach in the structural integrity of the tank and leakage of product therefrom. Additionally, as product is unloaded from the tank car into distribution tanks, vapors are displaced from the distribution tanks. These vapors may be captured and returned to the tank car by means of a hose that would be attached to the tubular portion 28, of the housing 12.

Once the tank car is loaded, or unloaded, the valve is actuated to depressurize the chamber 38, resulting in closing of the poppet 30, under the influence of the spring bellows 46.

The factor to be noted is that, in the various operation modes of the present tank venting system, the pneumatic system actuating the poppet 30 is isolated from and cannot be contaminated by, hazardous, corrosive vapors in the passageway controlled by the vent poppet 30.

Variations, from the preferred embodiment herein disclosed, will occur to those skilled in the art, within the spirit and scope of the present inventive concepts. For example, and not by way of limitation, a bellows formed of an elastomeric material could be employed to provide a flexible barrier for sealing the pneumatic system from the vapor venting system and the necessarily resilient force for closing the poppet 30 provided by a separate spring member.

The scope of the invention is therefore to be derived from the following claims.

Having thus described the invention, what is claimed as novel and desired to be secured by Letters Patent of the United States is:

1. A tank truck venting system comprising a vent valve,
adapted to be mounted on the tank, and having
    a vent passage through which air may flow into and out of the tank,
    a first position in which flow of air through the vent passage is blocked and the tank is sealed, and
    a second position in which the vent passage is open for flow of air therethrough and the tank is vented, and
means, employing pressurized air from the tank truck's braking system, for displacing the vent valve to one of said positions,
characterized by
    means for isolating the pressurized air from the air flowing through the vent passage, and from all surfaces exposed to air from the vent passage, thereby preventing any hazardous vapors in the vent passage air from entering the brake system.

2. A tank truck venting system comprising a vent valve,
adapted to be mounted on the tank, and having
    a vent passage through which air may flow into and out of the tank,
    a valve seat peripherally of said vent passage,
    means for yieldingly maintaining the valve poppet in engagement with said seat preventing flow of air through said vent passage, and
means, employing pressurized air from the tank truck's braking system, for displacing the valve poppet to an open position in which air is free to flow through the vent passage,
characterized by
    means for isolating the pressurized air from the air flowing through the vent passage, and from all surfaces exposed to air from the vent passage, thereby preventing any hazardous vapors in the vent passage air from entering the brake system.

3. A tank truck venting system comprising a vent valve, adapted to be mounted on the tank, and comprising
a housing having
    a vertically disposed tubular portion, that defines one end of a vent passage,
    a horizontally disposed tubular portion, that defines an opposite end of the vent passage,
    a second vertically disposed tubular portion, projecting downwardly from the horizontal tubular portion and disposed centrally of the first vertically disposed tubular portion, said second vertically disposed tubular portion defining, in part, a valve actuation chamber,
a downwardly facing, valve seat formed on the first vertical tubular portion,
a poppet engageable with said valve seat,
said poppet having a stem projecting therefrom into the second tubular portion,
means for resiliently maintaining the poppet in a elevated position, in engagement with said valve seat, thereby closing the vent valve,
means for selectively introducing pressurized air, from the tank car's brake system, into the upper end of said second tubular portion,
characterized in that
    flexible means connect the upper end of the valve poppet stem to a lower portion of the second tubular housing portion, thereby completing the definition of an expansible chamber,
    said flexible means providing a fluid impervious seal between the brake air system and air flowing in the vent passage,
    whereby the brake system is isolated from hazardous vapors entrained in the air flowing in the vent passage.

4. A tank truck venting system as in claim 3 further characterized in that
the flexible means comprises
    bellows means, one end of which is connected to the second tubular portion and the other end of which is connected to the lower portion of the second tubular housing portion.

5. A tank truck venting system as in claim 4 further characterized in that
    the bellows means comprise a bellows which also functions to provide the resilient means for resiliently maintaining the valve poppet in sealing engagement with the valve seat.

6. A tank truck venting system as in claim 4 further characterized in that
a plug
    is threaded into the lower end of the second tubular portion, and
    has a central opening for slidably journaling the valve poppet stem.

7. A tank truck venting system as in claim 6 further characterized in that
the flexible means comprises
    a bellows assembly which includes
        an upper disc,
        a lower disc, and
        a resilient bellows, the upper end of which is bonded to the upper disc and the lower end of which is bonded to the lower disc, and
    the lower disc is sealingly clamped in the lower end of the second vertical housing portion by said plug to provide a static seal therebetween, and further characterized by
    static means sealingly securing the upper disc to the upper end of the valve poppet stem.

8. A tank truck venting system as in claim 5 further characterized in that
    the first and second vertical housing portions and the horizontal portion are integrally formed, and
    the bellows is formed of stainless steel, and
    polytetraflouroethylene O-rings are employed in providing a static seal between the valve poppet stem and the upper disc of the bellows assembly and between the lower disc and the second vertical tubular housing portion.

* * * * *